United States Patent
Ooba

(10) Patent No.: US 9,229,508 B2
(45) Date of Patent: Jan. 5, 2016

(54) IMAGE PROCESSING APPARATUS, INFORMATION PROCESSING METHOD, AND STORAGE MEDIUM

(71) Applicant: CANON KABUSHIKI KAISHA, Tokyo (JP)

(72) Inventor: Hideaki Ooba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 13/939,958

(22) Filed: Jul. 11, 2013

(65) Prior Publication Data

US 2014/0019783 A1 Jan. 16, 2014

(30) Foreign Application Priority Data

Jul. 13, 2012 (JP) ................................. 2012-158021

(51) Int. Cl.
G06F 1/26 (2006.01)
G06F 1/28 (2006.01)
G06F 1/32 (2006.01)

(52) U.S. Cl.
CPC .. G06F 1/26 (2013.01); G06F 1/28 (2013.01); G06F 1/3284 (2013.01); Y02B 60/1267 (2013.01)

(58) Field of Classification Search
CPC ........... G06F 1/26; G06F 1/28; G06F 1/3284; Y02B 60/1267
See application file for complete search history.

(56) References Cited

U.S. PATENT DOCUMENTS

| 8,495,401 B2 * | 7/2013 | Hwang | G06F 1/266 713/320 |
| 8,769,324 B2 * | 7/2014 | Narushima | G03G 15/5004 713/323 |
| 8,938,629 B2 * | 1/2015 | Hirano | G06F 1/266 358/406 |

FOREIGN PATENT DOCUMENTS

JP 2003-030061 A 1/2003

* cited by examiner

*Primary Examiner* — Thuan Du
(74) *Attorney, Agent, or Firm* — Canon U.S.A., Inc., IP Division

(57) ABSTRACT

To allow an information processing apparatus to further accurately calculate power consumption of an image processing apparatus, the image processing apparatus includes a communication unit configured to communicate with a control apparatus configured to transfer power supply state information indicating a power supply state to the information processing apparatus configured to calculate a power consumption amount based on the power supply state information, and a control unit configured to control the communication unit so as to transmit information for calculating a power consumption amount of the image processing apparatus during a period from detection about the shift to the state prohibiting a transfer to the information processing apparatus to detection about the shift to the state allowing the transfer to the information processing apparatus, to the control apparatus together with the power supply state information.

9 Claims, 12 Drawing Sheets

IMAGE PROCESSING APPARATUS, INFORMATION PROCESSING METHOD, AND STORAGE MEDIUM

BACKGROUND OF THE INVENTION

1. Field of the Invention

The present invention relates to an image processing apparatus, an information processing method, and a storage medium.

2. Description of the Related Art

Conventionally, image forming apparatuses have transmitted a power supply state notification packet to an information processing apparatus in a local area network (hereinafter referred to as a LAN). This technique realizes such a system that the information processing apparatus in the LAN receives this power supply state notification packet, and acquires the state of the image forming apparatus based on information in this packet. For example, an image forming apparatus transmits a power supply state notification packet to an information processing apparatus when the image forming apparatus is powered on. Upon receiving this power supply state notification packet indicating that the image forming apparatus is powered on, the information processing apparatus acquires option information of the hardware of the image forming apparatus and the state (whether an error or the like occurs) of the image forming apparatus. Further, upon a shift to a sleep state, the image forming apparatus transmits a power supply state notification packet indicating the shift to the sleep state to the information processing apparatus. The information processing apparatus can detect that the image forming apparatus has shifted to the sleep state by receiving this power supply state notification packet, and stops acquiring information regarding the image forming apparatus if necessary. As a result, the information processing apparatus refrains from transmitting an unnecessary inquiry packet to the image forming apparatus, whereby the image forming apparatus can be maintained in the sleep state. On the other hand, upon returning from the sleep state, the image forming apparatus transmits to the LAN a power supply state notification packet indicating the return. Therefore, upon receiving this packet, the information processing apparatus restarts acquiring information of the image forming apparatus. Further, in recent years, there has been an application that detects the power supply state of an image forming apparatus, calculates the power consumption of the image forming apparatus, and displays this value in the form of a list (hereinafter referred to as a power calculation application). This power calculation application is located in the information processing apparatus in the LAN, and detects the power supply state of the image forming apparatus based on a power supply state notification packet transmitted from the image forming apparatus to calculate the power consumption amount. Therefore, when a predetermined time has elapsed or the power supply state changes, the image forming apparatus has to immediately transmit a power supply state notification packet indicating that. However, the image forming apparatus is not necessarily constantly in a powered-on state, whereby the image forming apparatus may be in a powered-off state at the time that the image forming apparatus is supposed to transmit a power supply state notification packet. As a method that can solve this problem, Japanese Patent Application Laid-Open No. 2003-30061 discusses such a method that, in a case where a power supply state notification time has come when an image forming apparatus is in a powered-off state, the image forming apparatus transmits a power supply state notification packet next time the image forming apparatus is powered on, even if a next notification time has not come yet. According to this method, the power calculation application can further accurately calculate the power consumption of the image forming apparatus.

However, there is generally known such a system that, when shutting down an image forming apparatus which a printing control apparatus is connected to, a user manually performs a shutdown operation on each of the printing control apparatus and the image forming apparatus to cause each apparatus to individually perform shutdown processing. Therefore, when the user starts up only the image forming apparatus to use a copy function of the image forming apparatus or select a screen setting or the like of the image forming apparatus, the printing control apparatus may be in a powered-off state. The system in which the printing control apparatus is connected to the image forming apparatus is such a system that the printing control apparatus temporarily acquires a power supply state notification packet transmitted from the image forming apparatus, and transfers it to an information processing apparatus existing in the LAN. Therefore, when the above-described printing control apparatus is in a powered-off state and only the image forming apparatus is in a powered-on state, the power supply state notification packet transmitted from the image forming apparatus can never be delivered to the information processing apparatus existing in the LAN.

SUMMARY OF THE INVENTION

The present invention is directed to a technique allowing an information processing apparatus to further accurately calculate a power consumption amount of an image processing apparatus.

According to an aspect of the present invention, an image processing apparatus includes a communication unit configured to communicate with a control apparatus configured to transfer power supply state information indicating a power supply state of the image processing apparatus to an information processing apparatus configured to calculate a power consumption amount based on the power supply state information, a first detection unit configured to detect a shift of the control apparatus to such a state that the control apparatus cannot transfer the power supply state information to the information processing apparatus, a second detection unit configured to detect a shift of the control apparatus to such a state that the control apparatus can transfer the power supply state information to the information processing apparatus, and a control unit configured to control the communication unit so as to transmit information for calculating a power consumption amount of the image processing apparatus during a period from detection by the first detection unit about the shift to the state prohibiting a transfer to the information processing apparatus to detection by the second detection unit about the shift to the state allowing the transfer to the information processing apparatus, to the control apparatus together with the power supply state information.

According to exemplary embodiments of the present invention, the information processing apparatus can further accurately calculate the power consumption of the image processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
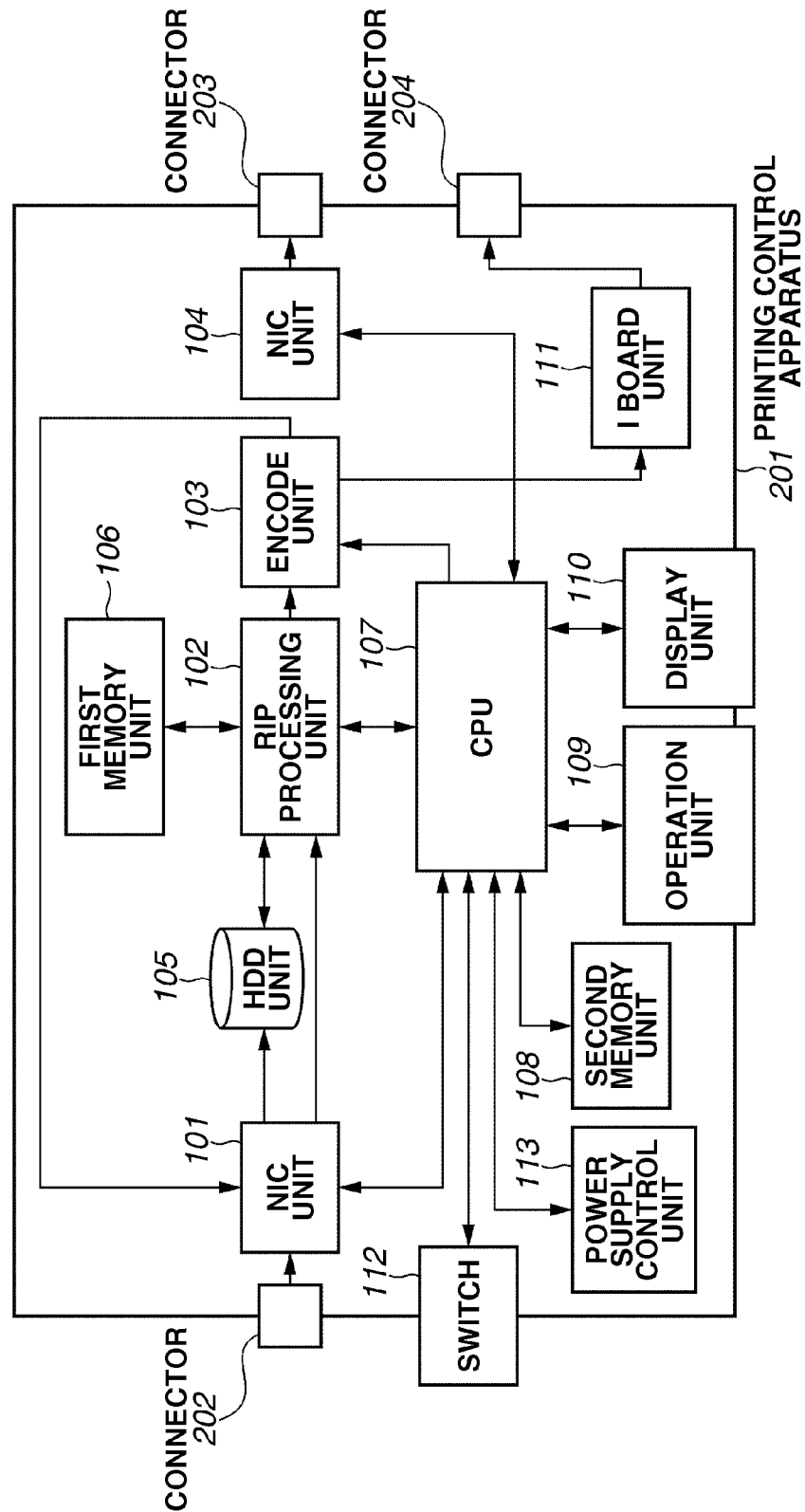
FIG. 1 illustrates an example of a hardware configuration of a printing control apparatus.
Figure 2:
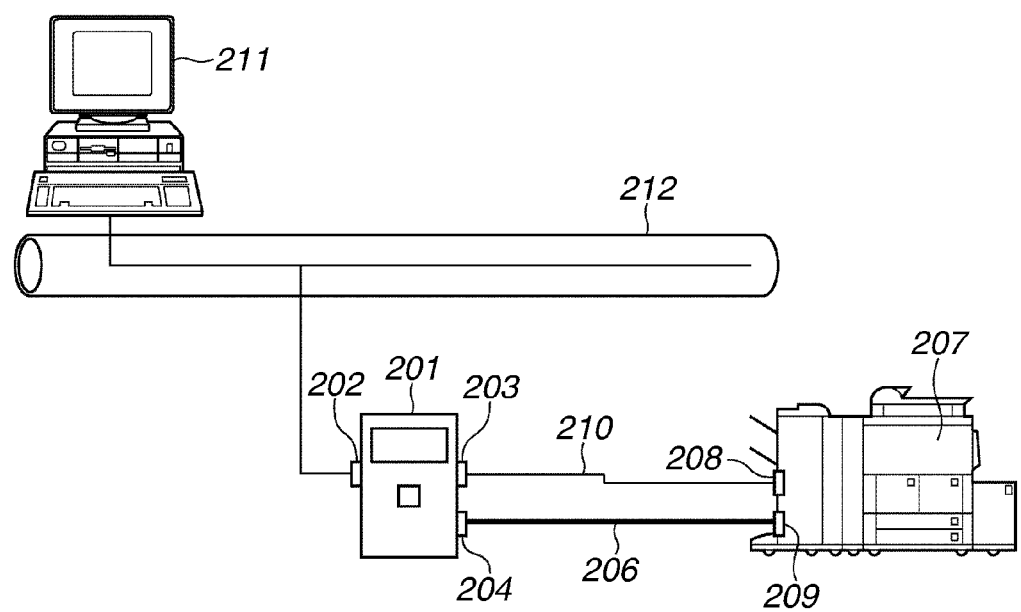
FIG. 2 illustrates an example of a system configuration of a printing system.

FIG. 1 illustrates an example of a hardware configuration of a printing control apparatus 201. FIG. 2 illustrates an example of a system configuration of a printing system. Referring to FIG. 1, the printing control apparatus 201 includes connectors 202, 203, and 204. A network interface card (NIC) unit 101 serves as a first network interface in charge of connection of a low layer level with a network 212 illustrated in FIG. 2. A raster image processer (RIP) processing unit 102 functions to rasterize received data written in a print language such as Page Description Language (PDL) or data in a specific data format (compressed according to, for example, Joint Bi-level Image Experts Group (JBIG)) into a raster image. An encode unit 103 functions to convert the rasterized data into print data or a data format in the form supported by an image forming apparatus 207. A NIC unit 104 serves as a second network interface in charge of connection of a low layer level. A hard disk drive (HDD) unit 105 functions to temporarily store (spool) the print data received by the NIC unit 101, or temporarily store the compressed data processed by the RIP processing unit 102. A first memory unit 106 is used when the RIP processing unit 102 rasterizes an image. A central processing unit (CPU) 107 is in charge of control of the whole printing control apparatus 201. A second memory unit 108 is used by the CPU 107 as a temporary data storage area. An operation unit 109 includes, for example, a button, a key, and a touch panel, and allows a user to operate the printing control apparatus 201. A display unit 110 functions to transmit information to the user with an image or characters. Further, the printing control apparatus 201 includes an image interface board (I board unit) 111. The connector 204 serves as an interface of the I board unit 111. A dedicated transmission path is created for image data with use of the I board unit 111 and the connector 204, and the image data is transferred through this path. A switch 112 receives a user's shutdown operation and a user's startup operation. When the switch 112 is operated, an interruption is issued to the CPU 107. The CPU 107 controls a power supply control unit 113 according to the state upon detecting the interruption.

The CPU 107 performs processing based on a program stored in, for example, the second memory unit 108, thereby realizing the function of the printing control apparatus 201 and processing illustrated in a flowchart regarding the printing control apparatus 201, which will be described below.

A data packet from an information processing apparatus 211 to the printing control apparatus 201 is transmitted via the network 212, and is introduced into the printing control apparatus 201 via the connector 202. Within the printing control apparatus 201, the data receiving processing is performed by the NIC unit 101. When print data is received, the received data is written into the HDD unit 105 as necessary, under the control by the CPU 107. This is queuing (spooling), which is generally performed for the purpose of, for example, improving a data transmission speed. The data written in the HDD unit 105 is read therefrom according to an instruction from the CPU 107. On the other hand, print data that is not queued is directly transferred to the RIP processing unit 102 according to an instruction from the CPU 107. The print data transmitted to the RIP processing unit 102 in this manner is rasterized into a raster image by the RIP processing unit 102. Subsequently, the encode unit 103 encodes the rasterized data into a data format interpretable by the image forming apparatus 207 based on the preset data format interpretable by the image forming apparatus 207 and the format of the received data. The encoding processing is performed only when necessary, and therefore is skipped for data that does not have to be encoded, such as received print data in a format interpretable by the image forming apparatus 207 even without being encoded. The encoded data has to be in a format interpretable by the image forming apparatus 207. For example, this format may be a specific print language format or a data format compressed by a specific method such as JBIG. This format varies depending on the capability of an interpretation unit provided in the image forming apparatus 207. The data encoded as necessary in this way is converted into a data packet again by the NIC unit 104 so as to be transmittable to a LAN 210, is output from the connector 203, and is transmitted to the image forming apparatus 207 via the LAN 210 and a network interface 208. Upon receiving this data packet, the image forming apparatus 207 prints the data onto a recording medium such as paper according to a print processing procedure of the image forming apparatus 207. As another data transmission method, the data is transferred to the I board unit 111 via the encode unit 103, is output from the connector 204, is transmitted through a dedicated transmission path 206, and then is introduced into the image forming apparatus 207 via a connector 209.

The information processing apparatus 211 transmits the data packet to the printing control apparatus 201 in this manner, whereby the information processing apparatus 211 has to acquire the power supply states of the printing control apparatus 201 and the image forming apparatus 207, and the states indicating whether they are operating normally at appropriate timings. Therefore, the information processing apparatus 211 performs polling for acquiring the states at constant time intervals, and acquires a state change notification packet transmitted from the printing control apparatus 201 or the image forming apparatus 207 to change the processing. For example, upon receiving a power supply state notification packet transmitted when the image forming apparatus 207 is powered off, the information processing apparatus 211 stops performing polling, and therefore can prevent unnecessary traffic from being added on the network 212. The power supply state notification packet is one example of power supply state information.

As illustrated in FIG. 2, in the respective exemplary embodiments that will be described below, the information processing apparatus 211 and the printing control apparatus 201 are communicably connected to each other via the network 212. Further, the printing control apparatus 201 and the image forming apparatus 207 are communicably connected to each other via the LAN 210 and/or the dedicated transmission path 206.

Figure 3:
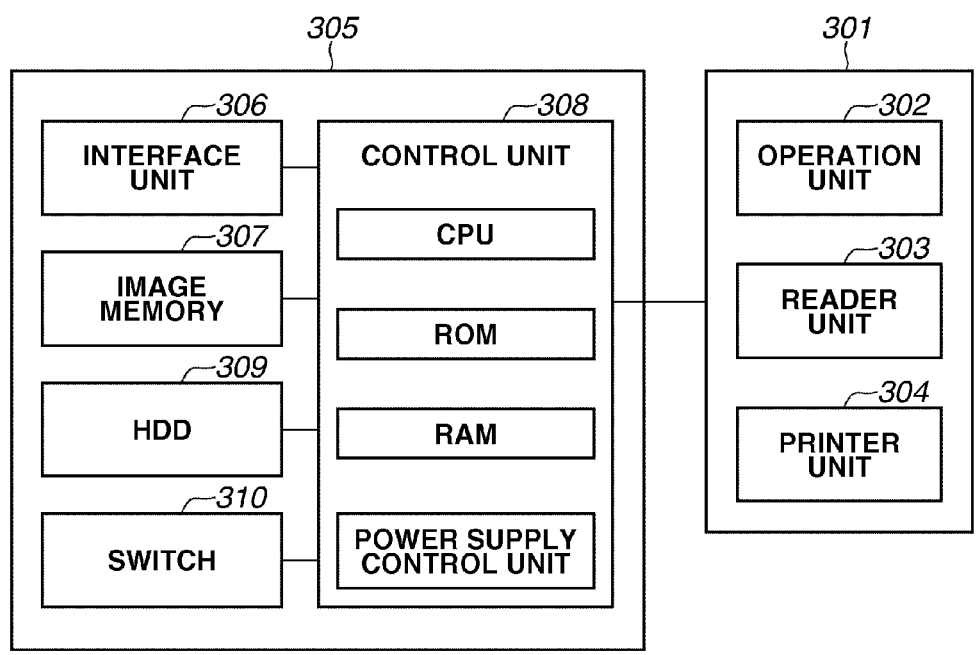
FIG. 3 is an example of a hardware configuration of an image forming apparatus.

FIG. 3 illustrates an example of a hardware configuration of the image forming apparatus 207. Referring to FIG. 3, the image forming apparatus 207 according to the exemplary embodiments of the present invention includes an image forming apparatus main body 301 and an image input/output control unit 305. The image forming apparatus main body 301 includes an operation unit 302, a reader unit 303, and a printer unit 304. The operation unit 302 is used to operate the image forming apparatus main body 301 and the image input/output control unit 305. The reader unit 303 reads an image of a document, and outputs image data according to the document image to the printer unit 304 and the image input/output control unit 305. The printer unit 304 records an image according to the image data from the reader unit 303 and the image input/output control unit 305 onto recording paper. The image input/output control unit 305 is connected to the reader unit 303, and includes an interface unit 306, an image memory 307, a control unit 308, and a hard disk (HDD) 309. The hard disk (HDD) 309 stores the settings of the image forming apparatus 207 (for example, an address book, an operation history, a user setting, an identification (ID) setting, and a network setting). The interface unit 306 is an interface between the printing control apparatus 201 and the information processing apparatus 211 in the network 212, and the control unit 308. This interface unit 306 receives code data expressing an image transferred from the printing control apparatus 201 via the connector 209, develops the received data into image data recordable by the printer unit 304, and provides the developed data to the control unit 308. Further, the interface unit 306 receives code data expressing image data transferred from the printing control apparatus 201 via the network interface 208 such as an Ethernet (registered trademark). The interface unit 306 develops the received data into data recordable by the printer unit 304 if necessary, and provides the developed data to the control unit 308. Further, the connector 209 may be a network interface, and may be configured to be connected to the printing control apparatus 201 via a network. Alternatively, the connector 209 may be an interface such as a parallel interface or a universal serial bus (USB) interface, and may be configured to be directly connected to the printing control apparatus 201 via an interface cable or the like. Further, the interface cable or the like may be realized by not only a single cable but also a large number of cables. The control unit 308 includes a CPU, a read only memory (ROM), a random access memory (RAM), a power supply control unit, and others. The CPU of the control unit 308 loads a program stored in the ROM or another storage medium onto the RAM, and executes the loaded program. The CPU performs processing based on this program, thereby controlling a data flow between, for example, the respective reader unit 303, interface unit 306, and image memory 307.

Instead of the HDD 309, the image forming apparatus 207 may include another non-volatile memory that prevents data from being deleted even when the image forming apparatus 207 is powered off, and may be configured to store data in this non-volatile memory. The switch 310 receives a user's shutdown operation and a user's startup operation. When the switch 310 is operated, an interruption is issued to the control unit 308. Upon receiving this interruption, the CPU of the control unit 308 controls the power supply control unit according to the state.

The CPU performs processing based on the program stored in, for example, the ROM, thereby realizing the function of the image forming apparatus 207 and processing illustrated in flowcharts regarding the image forming apparatus 207, which will be described below.

Figure 4:
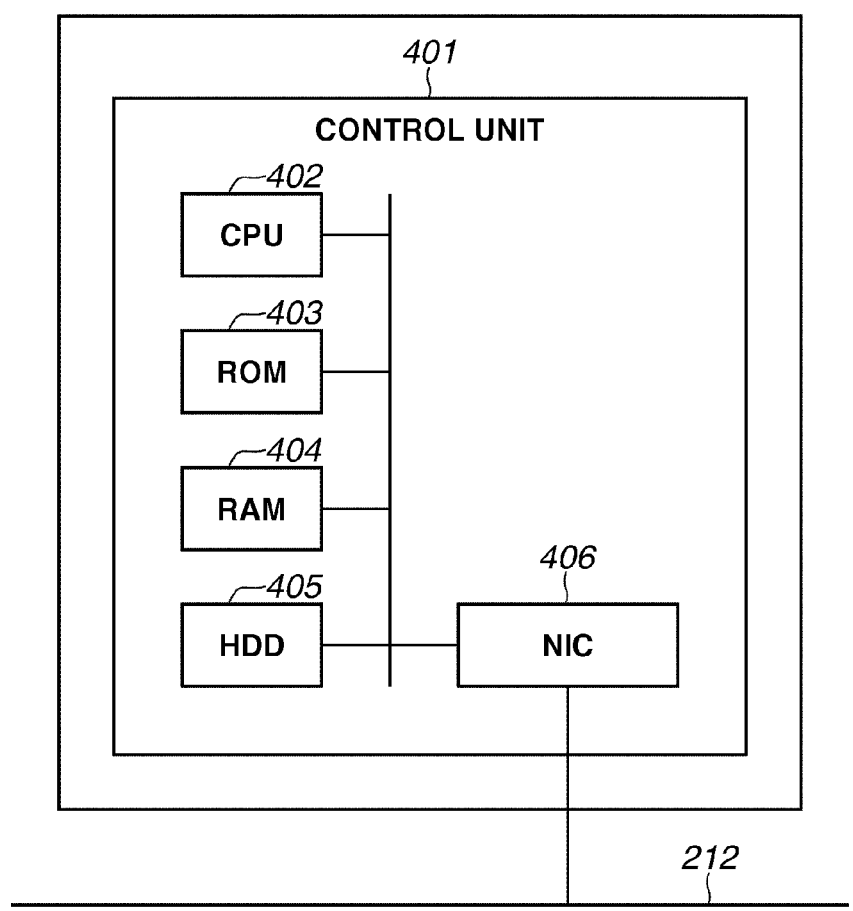
FIG. 4 illustrates an example of a hardware configuration of an information processing apparatus.

FIG. 4 illustrates an example of a hardware configuration of the information processing apparatus 211. A control unit 401 including a CPU 402 controls an operation of the whole information processing apparatus 211. The CPU 402 reads out a control program stored in a ROM 403 to perform various kinds of control processing. A RAM 404 is used as a temporary storage area of the CPU 402, such as a main memory and a work area. An HDD 405 stores image data and various kinds of programs, or various kinds of information tables.

A NIC 406 connects the control unit 401 (the information processing apparatus 211) to the network 212. The NIC 406 transmits and receives various kinds of information between the information processing apparatus 211 and another apparatus in the network 212. The CPU 402 performs processing based on a program that realizes information processing for power calculation stored in, for example, the ROM 403 or the HDD 405. This execution can realize the function (for example, the function of the power calculation application that calculates power consumed by the image forming apparatus 207 based on, for example, a power supply state notification packet) of the information processing apparatus 211 and processing illustrated in a flowchart regarding the information processing apparatus 211, which will be described below.

A first exemplary embodiment will be described with reference to FIGS. 5, 6, and 7. The first exemplary embodiment relates to processing for calculating a time during which the image forming apparatus 207 is in operation alone, adding this time information to a power supply state notification packet, and transmitting this packet. This processing will be described now.

Figure 5:
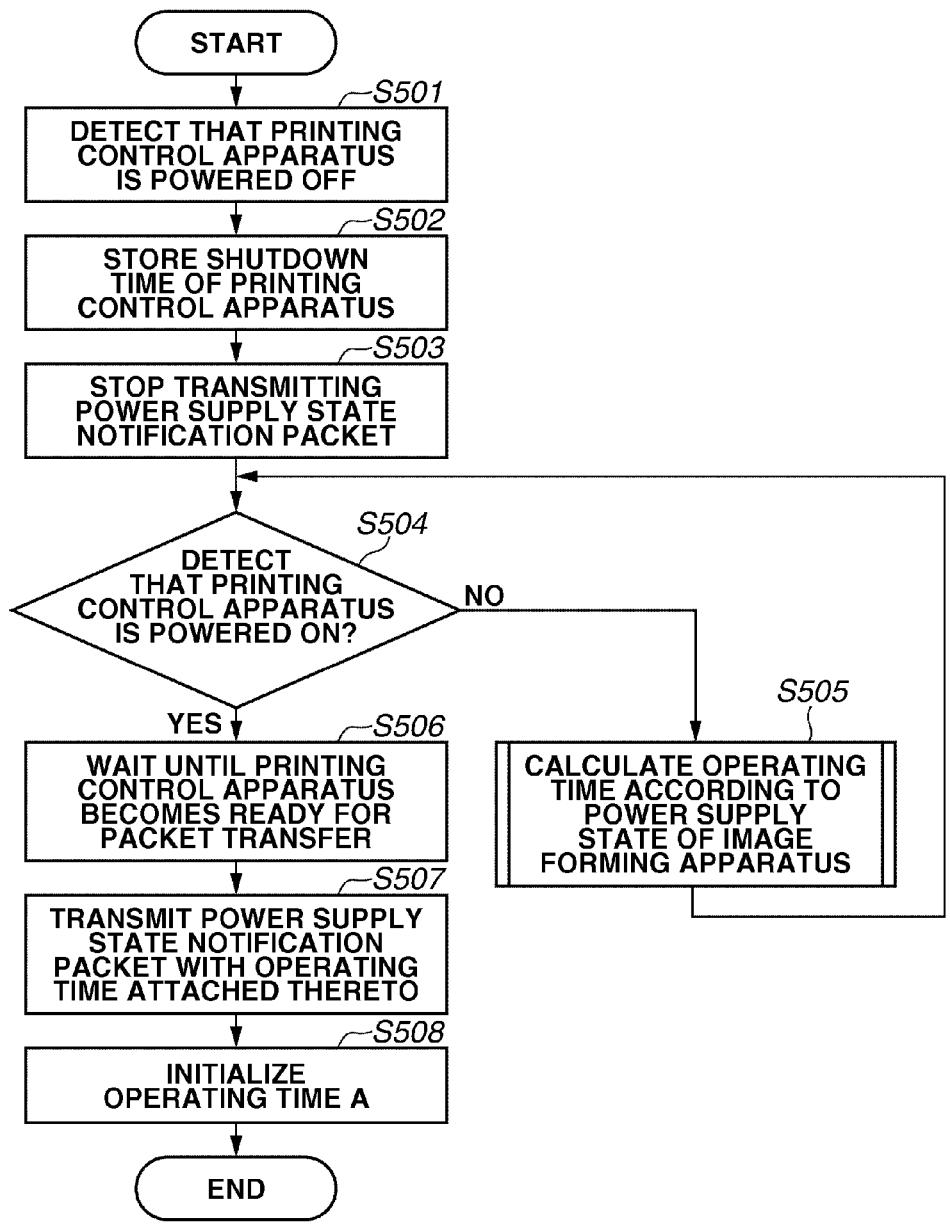
FIG. 5 is a flowchart illustrating an example of information processing in the image forming apparatus according to a first exemplary embodiment.

FIG. 5 is a flowchart illustrating an example of information processing in the image forming apparatus 207 according to the first exemplary embodiment.

In step S501, the CPU of the control unit 308 (hereinafter referred to as simply the control unit 308) detects that the printing control apparatus 201 is powered off (first detection). The interface unit 306 connected to the printing control apparatus 201 detects that the link is cut off, by which the control unit 308 detects that the printing control apparatus 201 is powered off. Alternatively, as another method, the printing control apparatus 201 may transmit a shutdown notification to the image forming apparatus 207 before being powered off so that the control unit 308 can detect that the printing control apparatus 201 is powered off. Upon detecting that the printing control apparatus 201 is powered off in step S501, the control unit 308 advances the processing to step S502.

In step S502, the control unit 308 stores the time at which the control unit 308 detected that the printing control apparatus 201 was powered off. In another exemplary embodiment, the control unit 308 may store the transmission time of the power supply state notification packet that the image forming apparatus 207 transmitted the last time. After storing the time in step S502, the control unit 308 advances the processing to step S503.

In step S503, the control unit 308 stops transmitting the power supply state notification packet that the image forming apparatus 207 is supposed to transmit. According to the present first exemplary embodiment, an address directed to an unspecified destination such as a broadcast address or a multicast address is used as a destination address of the power supply state notification packet. Therefore, the user does not have to set the address of the information processing apparatus 211 in which the power calculation application is installed, to the image forming apparatus 207 in advance. Alternatively, the control unit 308 may continue transmitting the power supply state notification packet without stopping it. After stopping transmitting the power supply state notification packet in step S503, the control unit 308 advances the processing to step S504.

In step S504, the control unit 308 detects that the printing control apparatus 201 is powered on (second detection). The control unit 308 detects that the printing control apparatus 201 is powered on in step S504 by a similar method to the method performed in step S501. The interface unit 306 connected to the printing control apparatus 201 detects that the link is reestablished, by which the control unit 308 detects that the printing control apparatus 201 is powered on. Further, as another method, the printing control apparatus 201 may transmit a startup notification to the image forming apparatus 207 upon detection that the printing control apparatus 201 is powered on and shifts to a usable state, so that the control unit 308 can detect that the printing control apparatus 201 is powered on. If the printing control apparatus 201 remains in the powered-off state in step S504 (NO in step S504), the control unit 308 advances the processing to step S505.

In step S505, the control unit 308 calculates an operating time of the image forming apparatus 207 until both the image forming apparatus 207 and the printing control apparatus 201 are powered on.

Figure 6:
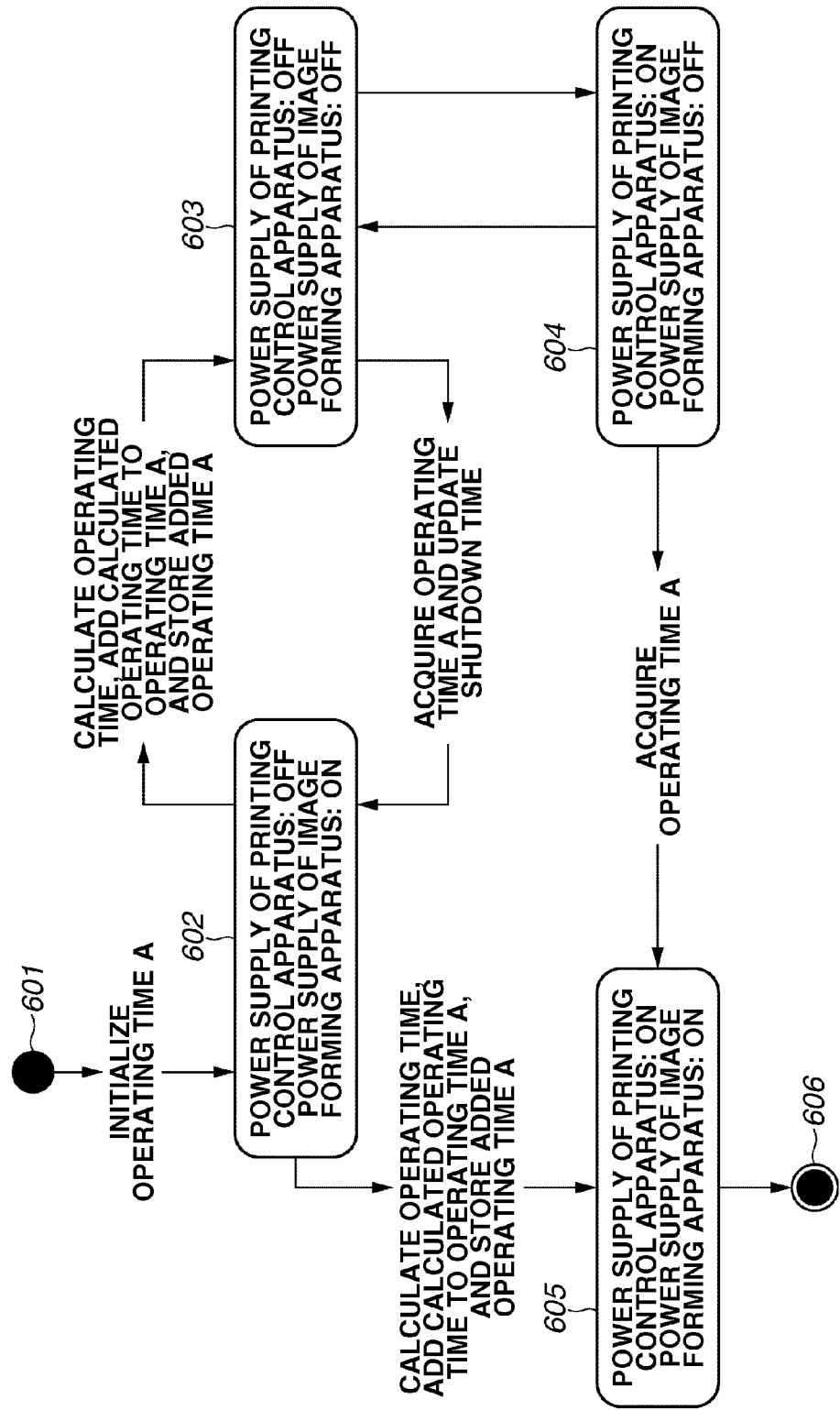
FIG. 6 is a state transition diagram illustrating a process of step S505 or the like in FIG. 5.
Figure 7:
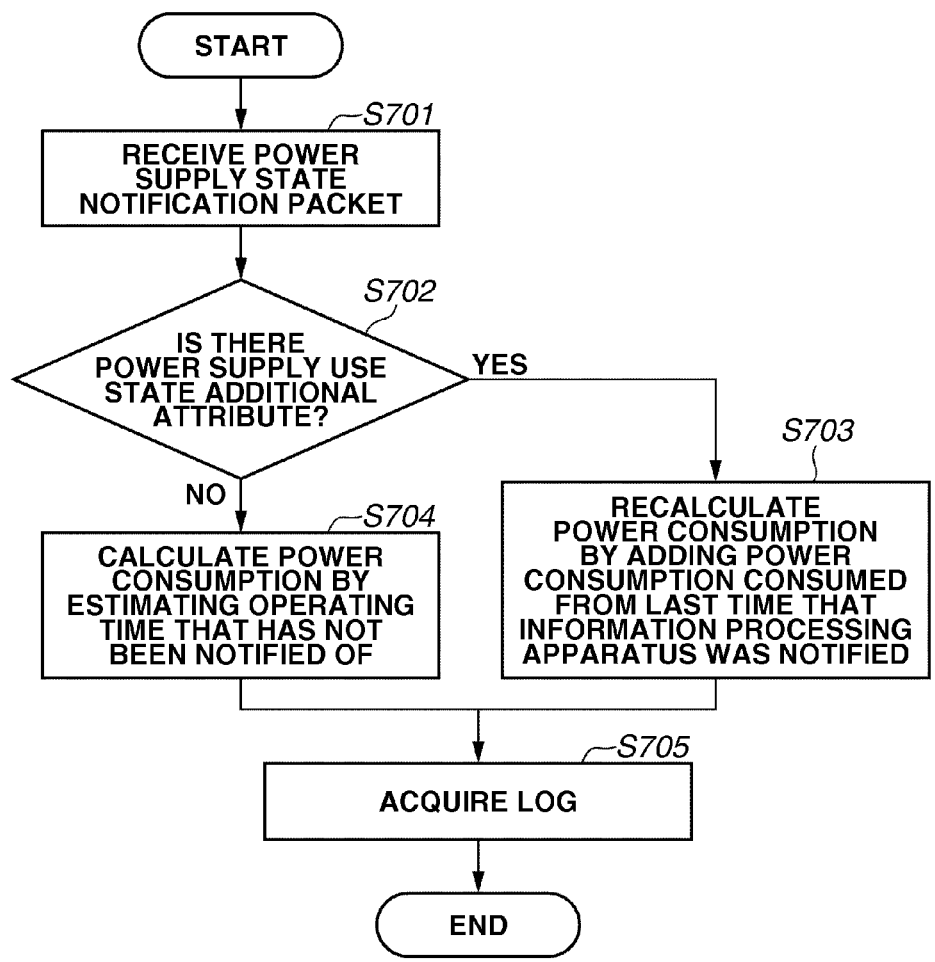
FIG. 7 is a flowchart illustrating an example of information processing in the information processing apparatus.

FIG. 6 illustrates this process of step S505 and the like as a state transition diagram. From a state 601, this state transition starts.

Upon the start, the printing system shifts to a state 602. During this shift to the state 602, the control unit 308 initializes an operating time A, which is a variable stored when the control unit 308 calculates the operating time. Upon the shift to the state 602, the printing system is set in such a state that the printing control apparatus 201 is powered off while the image forming apparatus 207 is powered on. In this state 602, the control unit 308 monitors the power supply states of the image forming apparatus 207 and the printing control apparatus 201. When a change occurs in any of the states, the printing system shifts to another state. The state 602 is a state established when only the function of the image forming apparatus 207 is required. If the image forming apparatus 207 is powered off in this state, the printing system sifts from the state 602 to a state 603. Before the shift from the state 602 to the state 603, the control unit 308 calculates a time during which the image forming apparatus 207 is in operation with use of the time stored in step S502 and the present time, and stores this time in the operating time A.

When the image forming apparatus 207 is powered on in the state 603, the printing system sifts from the state 603 to the state 602. Before the shift to the state 602, the control unit 308 acquires the value of the operating time A and a shutdown time of the printing control apparatus 201, which is stored in step S502, or a shutdown time stored at the time of the shift from the state 603 to the state 602, which will be described below. The control unit 308 updates the value of the shutdown time stored in step S502 with the time that the image forming apparatus 207 currently holds. The printing system shifts between the state 602 and the state 603 when the image forming apparatus 207 is powered off/on with the printing control apparatus 201 out of operation, which enables an accurate calculation of the time during which the image forming apparatus 207 is in operation.

Then, the printing system shifts from the state 603 to a state 604 in which the printing control apparatus 201 is powered on. This state will be described. The state 604 is established when the function of the printing control apparatus 201 is used. More specifically, the printing system is set into the state 604, for example, when the user only operates a job already stored in the printing control apparatus 201, and does not use the function of the image forming apparatus 207. In this case, because the image forming apparatus 207 is maintained in a powered-off state, the power supply state does not have to be calculated. If the printing control apparatus 201 is powered off in the state 604, the printing system shifts from the state 604 to the state 603. If the image forming apparatus 207 is powered on in the state 604, the printing system shifts from the state 604 to a state 605. Before the shift to the state 605, the control unit 308 acquires the value of the operating time A stored in the image forming apparatus 207.

Before proceeding to the description of the state 605, how the printing system shifts from the state 602 to the state 605 will be described. The state 602 is such a state that the printing control apparatus 201 is powered off while the image forming apparatus 207 is powered on. When the printing control apparatus 201 is powered on in the state 602, the printing system shifts from the state 602 to the state 605. Before the shift to the state 605, the control unit 308 acquires the shutdown time stored in step S502 and at the time of the shift from the state 603 to the state 602, calculates the difference from the present time, and adds the difference to the operating time A. In the state 605, both the printing control apparatus 201 and the image forming apparatus 207 are in operation. Therefore, the printing system shifts to an end state 606 to end the present state transition. The shift to the state 606 causes the end of the process of step S505 in the flowchart illustrated in FIG. 5. After the end of the process of step S505, the control unit 308 advances the processing to step S504.

In step S504, the control unit 308 checks the power supply state of the printing control apparatus 201 again. If the power supply state indicates that the printing control apparatus 201 is powered on (YES in step S504), the control unit 308 advances the processing to step S506.

In step S506, the control unit 308 waits until the printing control apparatus is powered on and becomes ready for a packet transfer. The control unit 308 makes an inquiry to the printing control apparatus 201 about whether the printing control apparatus 201 becomes ready for a packet transfer to check whether the printing control apparatus 201 becomes ready for a packet transfer. If the printing control apparatus 201 is ready for a packet transfer, the control unit 308 advances the processing to step S507.

In step S507, the control unit 308 adds (or attaches) a power supply use state additional attribute to the power supply state notification packet, sets the operating time A to this attribute value, and transmits this packet from the interface unit 306 to the LAN 210. After transmitting the packet, the control unit 308 advances the processing to step S508.

In step S508, the control unit 308 initializes the operating time A, and ends the processing in the image forming apparatus 207.

The power calculation application program is installed in the information processing apparatus 211, and the information processing in the information processing apparatus 211 will now be described with reference to the flowchart illustrated in FIG. 7. FIG. 7 is a flowchart illustrating an example of the information processing in the information processing apparatus 211.

In step S701, upon receiving the power supply state notification packet transmitted from the image forming apparatus 207 in step S507, the CPU 402 notifies the image forming apparatus 207 that the packet was received as necessary, and then advances the processing to step S702.

In step S702, the CPU 402 checks whether the power supply use state additional attribute is added to the received packet. If the power supply use state additional attribute is added to the received packet (YES in step S702), the CPU 402 advances the processing to step S703.

In step S703, the CPU 402 adds the power consumption amount calculated based on the time acquired from this attribute value to the power consumption amount that was stored the last time, and then advances the processing to step S705.

Referring back to step S702, if the power supply use state additional attribute is not added to the received packet in step S702 (NO in step S702), the CPU 402 advances the processing to step S704.

In step S704, the CPU 402 calculates the power consumption based on the power supply state of the image forming apparatus 207 acquired from a normal power supply state notification packet, and then advances the processing to step S705.

In step S705, the CPU 402 acquires from the image forming apparatus 207 not only the power supply state but also a log required to calculate the power supply state, such as a print log of the image forming apparatus 207. A log acquirement packet transmitted from the CPU 402 is first received by the NIC unit 101 of the printing control apparatus 201. Upon receiving this packet, the printing control apparatus 201 transfers this packet from the NIC unit 104 to the LAN 210. The image forming apparatus 207 receives this packet by the interface unit 306, and returns log information. Upon acquiring the log information from the image forming apparatus 207, the CPU 402 calculates the power consumption amount, and stores it as the power consumption amount of the image forming apparatus 207.

A second exemplary embodiment will be described with reference to FIGS. 8 and 9. The second exemplary embodiment relates to such an example that the printing control apparatus 201 becomes unable to communicate with the LAN 210 due to, for example, abnormality in the network (for example, the network cable is not connected) or a shift to a sleep state, and this example will be described now.

The processing in the information processing apparatus 211 is similar to the first exemplary embodiment, and therefore will not be described repeatedly.

Figure 8:
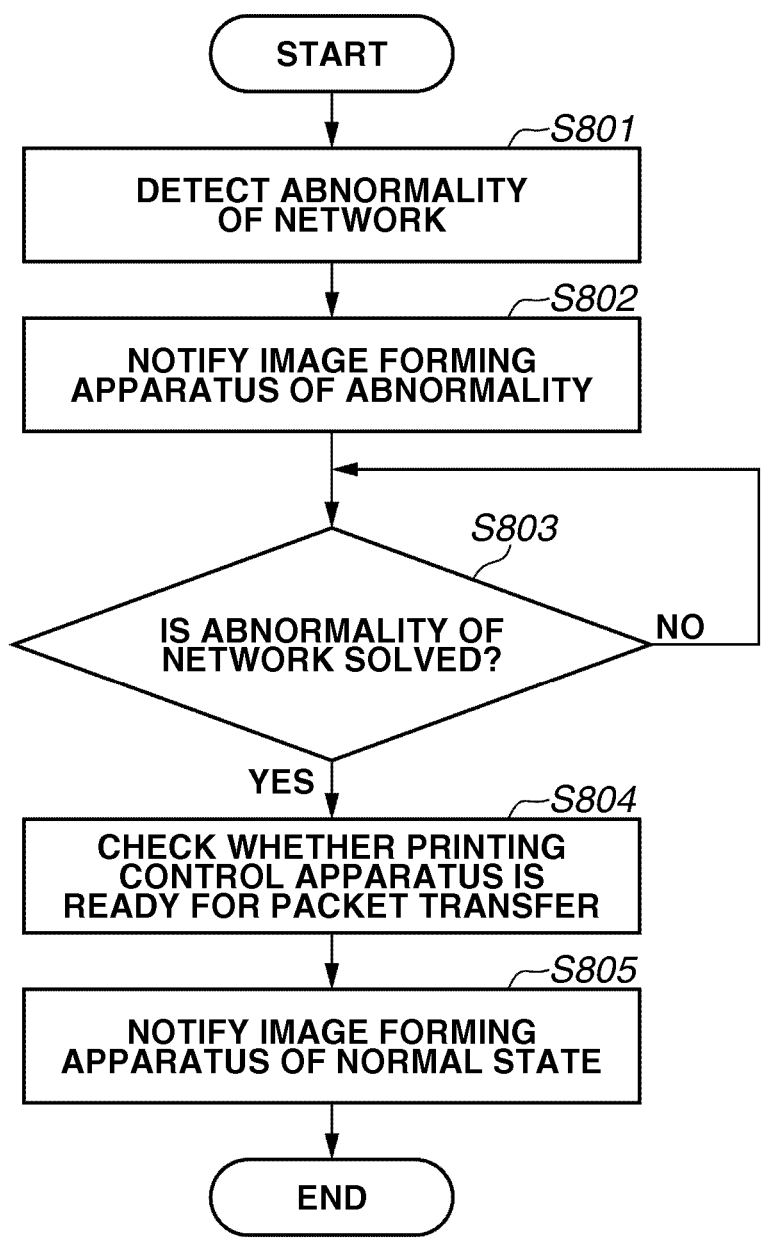
FIG. 8 is a flowchart illustrating an example of information processing in the printing control apparatus.

FIG. 8 is a flowchart illustrating an example of information processing in the printing control apparatus 201.

In step S801, the CPU 107 detects abnormality in the network. The abnormality in the network means a state in which the printing control apparatus 201 cannot communicate, for example, when the network cable is not connected to the connector 202 or a network address is not assigned to the NIC unit 101, and a state in which the printing control apparatus 201 shifts to a state unable to initiate communication, such as a sleep state. In step S801, upon detecting abnormality in the network, the CPU 107 advances the processing to step S802.

In step S802, the CPU 107 notifies the image forming apparatus 207 of the abnormality. If the printing control apparatus 201 cannot communicate with the image forming apparatus 207 in step S802, the CPU 107 may end the processing. If the printing control apparatus 201 can communicate with the image forming apparatus 207 in step S802, and notifies the image forming apparatus 207 of the abnormal state, the CPU 107 advances the processing to step S803.

If the abnormality in the network is solved at the printing control apparatus 201 in step S803 (YES in step S803), the CPU 107 advances the processing to step S804.

In step S804, the CPU 107 checks whether the printing control apparatus 201 is ready for a transfer of the power supply state notification packet transmitted from the image forming apparatus 207. The CPU 107 confirms whether the printing control apparatus 201 is ready for this transfer based on whether a process in charge of a packet transfer is in operation. If the CPU 107 can confirm that this process is in operation, the CPU 107 advances the processing to step S805.

In step S805, the CPU 107 notifies the image forming apparatus 207 that the abnormal state is solved. The determination whether the printing control apparatus 201 is ready for a packet transfer in step S804 may be made by the image forming apparatus 207 in a similar manner to the first exemplary embodiment.

Now, processing in the image forming apparatus 207 will be described with reference to FIG. 9.

Figure 9:
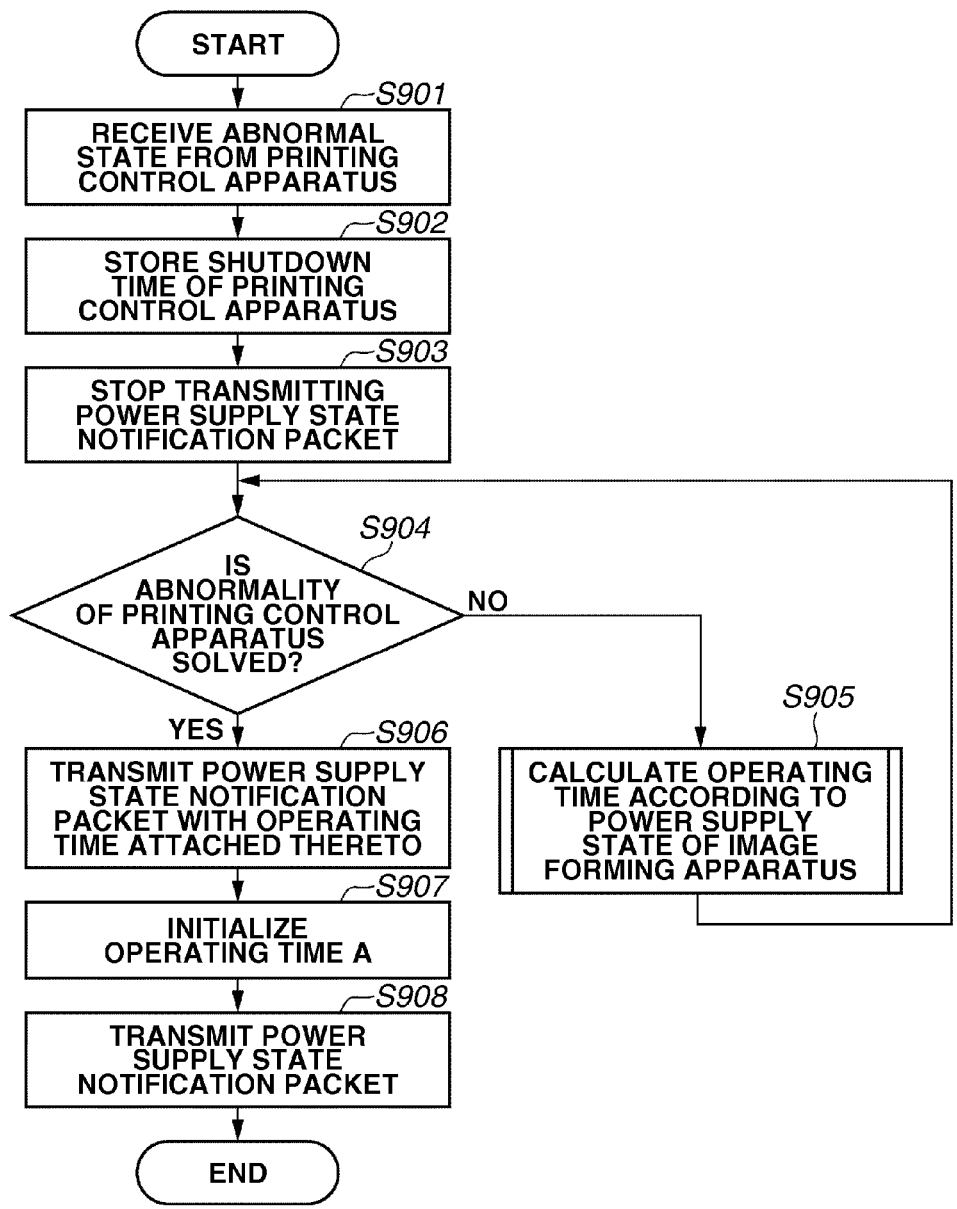
FIG. 9 is a flowchart illustrating an example of information processing in the image forming apparatus according to a second exemplary embodiment.

FIG. 9 is a flowchart illustrating an example of the image processing in the image forming apparatus 207 according to the second exemplary embodiment.

In step S901, upon being notified of a network abnormal state by the printing control apparatus 201 (the first detection), the control unit 308 advances the processing to step S902 to calculate the operating time of the image forming apparatus 207.

In step S902, the control unit 308 stores the time at which the control unit 308 detected that the printing control apparatus 201 was in an abnormal state. Alternatively, in another exemplary embodiment, the control unit 308 may store the transmission time of the power supply state notification packet that the image forming apparatus 207 transmitted the last time. Upon storing the time in step S902, the control unit 308 advances the processing to step S903.

In step S903, the control unit 308 stops transmitting the power supply state notification packet that the image forming apparatus 207 is supposed to transmit. Upon stopping transmitting the power supply state notification packet in step S903, the control unit 308 advances the processing to step S904.

In step S904, the control unit 308 detects whether the abnormal state is solved at the printing control apparatus 201 (the second detection). The control unit 308 detects that the abnormal state is solved at the printing control apparatus 201 in step S904 according to the transmission by the printing control apparatus 201 in step S805 illustrated in FIG. 8. If the abnormal state remains unsolved at the printing control apparatus 201 in step S904 (NO in step S904), the control unit 308 advances the processing to step S905.

The process of step S905 is similar to the process illustrated in FIG. 6 except that "POWER SUPPLY OF PRINTING CONTROL APPARATUS" in FIG. 6 is changed to the network state with "OFF" and "ON" in FIG. 6 respectively changed to abnormal and normal in step S905, and therefore will not be described repeatedly. If the image forming apparatus 207 is powered on and the network state of the printing control apparatus 201 returns to normal in step S905, the control unit 308 advances the processing to step S904.

In step S904, the control unit 308 checks again whether the abnormality is solved at the printing control apparatus 201. If the abnormality is solved (YES in step S904), the control unit 308 advances the processing to step S906.

The process of step S906 and the subsequent processes are similar to the process of step S507 and the subsequent processes according to the first exemplary embodiment illustrated in FIG. 5, and therefore will not be described repeatedly. At this time, the image forming apparatus 207 may check whether the printing control apparatus 201 becomes ready for a packet transfer in a similar manner to step S506 according to the first exemplary embodiment.

A third exemplary embodiment will be described with reference to FIGS. 10, 11, and 12. The third exemplary embodiment relates to an example that communicates with the information processing apparatus 211 with the power calculation application installed therein, which is set to the image forming apparatus 207 in advance, and this example will be described now.

Figure 10:
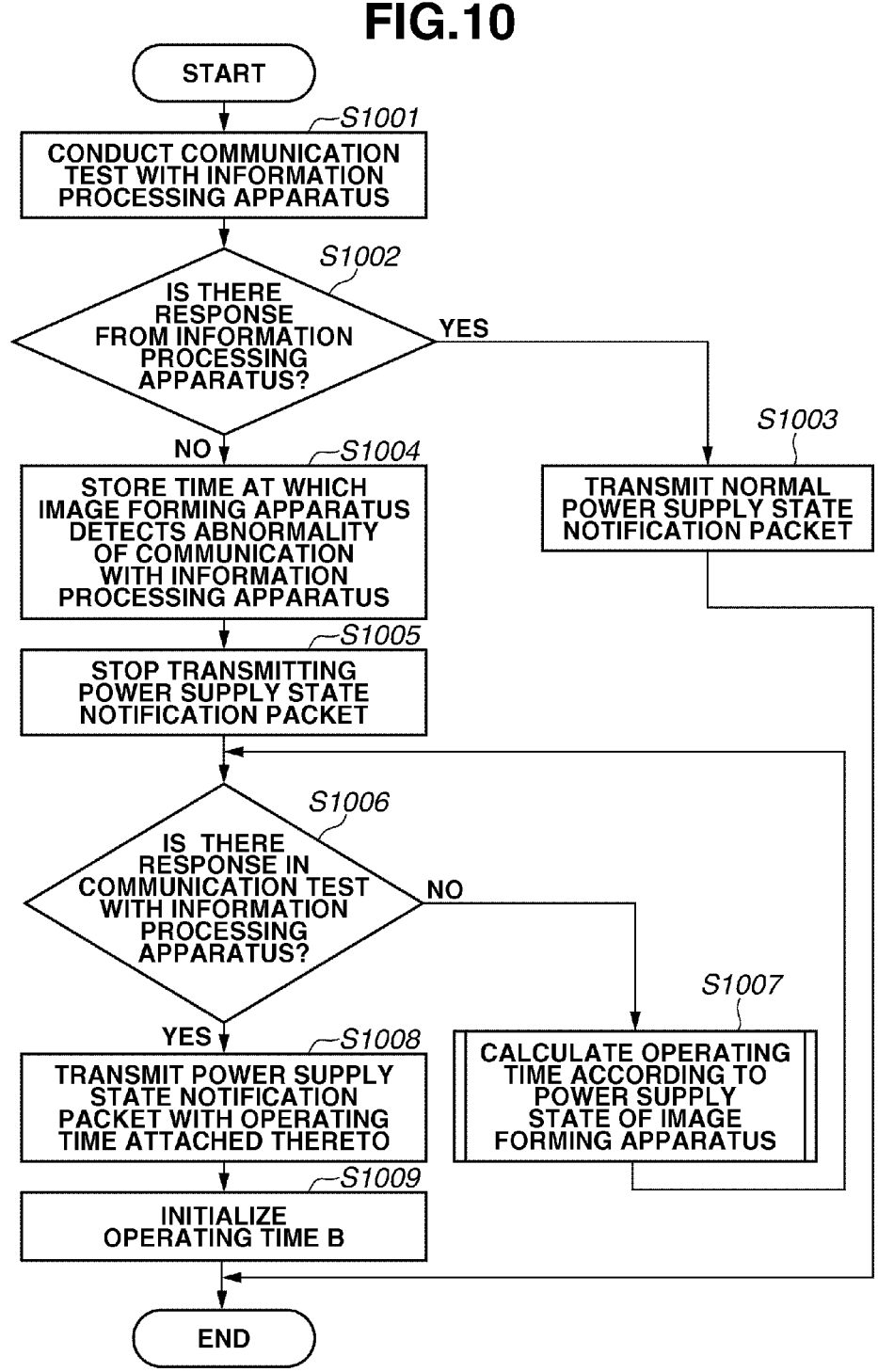
FIG. 10 is a flowchart illustrating an example of information processing in the image forming apparatus according to a third exemplary embodiment.

FIG. 10 is a flowchart illustrating an example of information processing in the image forming apparatus 207 according to the third exemplary embodiment.

In step S1001, the control unit 308 conducts a communication test with the information processing apparatus 211 with the power calculation application installed therein. The control unit 308 may conduct this communication test at predetermined time intervals, or may conduct this communication test when a change occurs in the power supply state of the image forming apparatus 207 (for example, at the time of a return from a sleep state). Further, the control unit 308 may conduct the communication test according to a transmission request instruction issued from the user. The control unit 308 acquires a destination address of a communication destination when conducting the communication test with the information processing apparatus 211.

Figure 11:
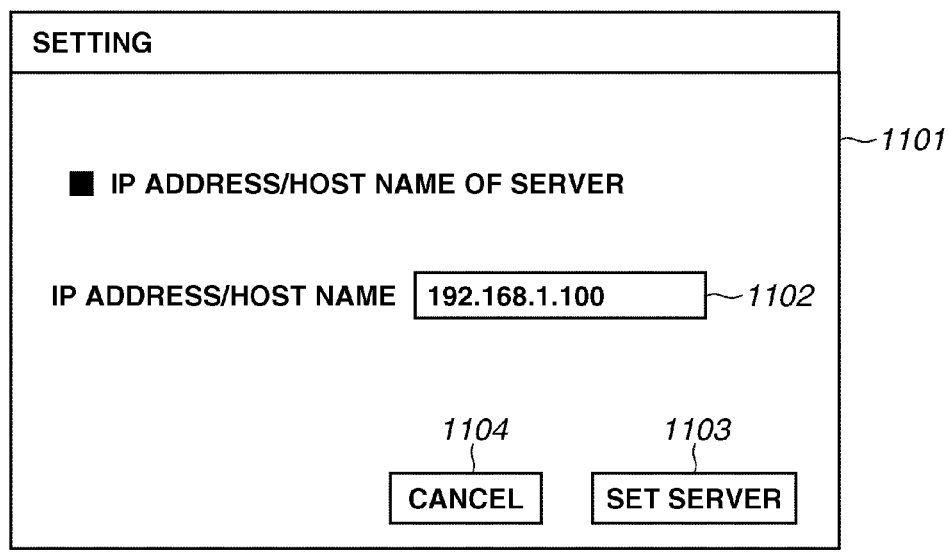
FIG. 11 is an example of a setting screen that prompts a user to input a destination address of the information processing apparatus.

FIG. 11 illustrates an example of a setting screen that prompts the user to input the destination address of the information processing apparatus 211. The control unit 308 displays the screen illustrated in FIG. 11 on, for example, the operation unit 302 based on a user's instruction to display a setting screen 1101. The setting screen 1101 is a screen displayed on the operation unit 302 of the image forming apparatus 207. An internet protocol (IP) address or a host name of the information processing apparatus 211 is input into an input form 1102. After the input is completed, the press of a setting button 1103 by the user causes the IP address or the host name to be stored in the HDD 309 of the image forming apparatus 207, and then triggers the end of the display of the setting screen 1101. Further, the press of a cancel button 1104 by the user prevents the set value from being stored, and also triggers the end of the display of the setting screen 1101. In step S1001, the control unit 308 acquires the destination address of the information processing apparatus 211 stored in this manner, and transmits the communication test packet from the image forming apparatus 207 to the information processing apparatus 211. Upon transmitting the communication test packet to the information processing apparatus 211, the control unit 308 advances the processing to step S1002.

In step S1002, the control unit 308 waits for a response to the communication test packet transmitted in step S1001. If there is a response as a result of the communication test in step S1002 (YES in step S1002), the control unit 308 determines that the information processing apparatus 211 is in operation and there is no abnormality in a communication path among the information processing apparatus 211, the image forming apparatus 207, and the printing control apparatus 201. Therefore, the control unit 308 advances the processing to step S1003.

In step S1003, the control unit 308 transmits the power supply state notification packet. In step S1003, the control unit 308 notifies the information processing apparatus 211 of only the power supply state of the image forming apparatus 207, and does not transmit a power supply use state additional attribute, which is additional information.

Referring back to step S1002, if the control unit 308 fails in the communication test with the information processing apparatus 211 in step S1002 (the first detection) (NO in step S1002), the control unit 308 determines that the information processing apparatus 211 or the power calculation application is out of operation, or there is abnormality in the communication path among the information processing apparatus 211, the image forming apparatus 207, and the printing control apparatus 201. Therefore, even if the control unit 308 transmits the power supply state notification packet, this packet does not reach the information processing apparatus 211. In this case, the control unit 308 advances the processing to step S1004.

In step S1004, the control unit 308 stores the time at which the control unit 308 failed in the communication test with the information processing apparatus 211. Alternatively, in another exemplary embodiment, the control unit 308 may store the transmission time of the power supply state notification packet that the image forming apparatus 207 transmitted the last time. Upon storing the time in step S1004, the control unit 308 advances the processing to step S1005, in which the control unit 308 stops transmitting the power supply state notification packet that the image forming apparatus 207 is supposed to transmit.

Upon stopping transmitting the power supply state notification packet in step S1005, the control unit 308 advances the processing to step S1006.

In step S1006, the control unit 308 conducts a communication test with the information processing apparatus 211. The control unit 308 conducts the communication test with the information processing apparatus 211 in step S1006 by the same method as the method performed in step S1001. If the control unit 308 remains failing in the communication test with the information processing apparatus 211 in step S1006 (NO in step S1006), the control unit 308 advances the processing to step S1007.

In step S1007, the control unit 308 calculates the operating time of the image forming apparatus 207 until the image forming apparatus 207 is powered on and the control unit 308 succeeds in the communication test with the information processing apparatus 211.

Figure 12:
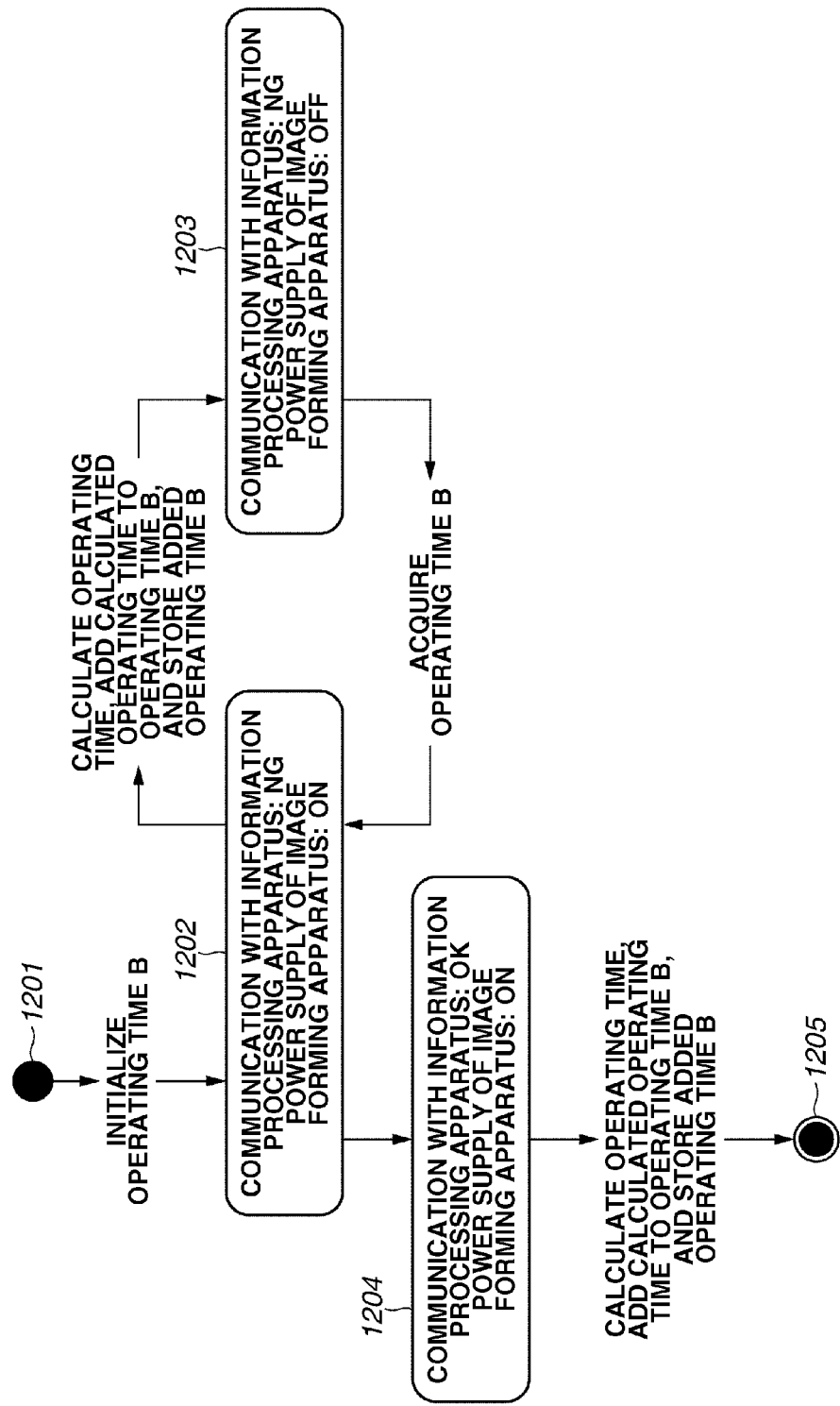
FIG. 12 is a state transition diagram illustrating a process of step S1007 or the like in FIG. 10.

FIG. 12 illustrates this process of step S1007 and the like as a state transition diagram.

This state transition starts from a state 1201.

Upon the start, the printing system shifts to a state 1202. During this shift to the state 1202, the control unit 308 initializes an operating time B, which is a variable stored when the control unit 308 calculates the operating time. Upon the shift to the state 1202, the printing system is set in such a state that the control unit 308 cannot communicate with the information processing apparatus 211, and the image forming apparatus 207 is powered on. In this state 1202, the control unit 308 periodically conducts a communication test to the information processing apparatus 211. If the image forming apparatus 207 is powered off in this state, the printing system shifts from the state 1202 to a state 1203. Before the shift from the state 1202 to the state 1203, the control unit 308 calculates a time during which the image forming apparatus 207 is in operation with use of the time stored in step S1004 and the present time, and stores this time in the operating time B. If the image forming apparatus 207 is powered on in the state 1203, the printing system sifts from the state 1203 to the state 1202. Before the shift to the state 1202, the control unit 308 acquires the operating time B and the time of the failure in the communication test with the information processing apparatus 211, which is stored in step S1004, or a shutdown time stored at the time of the shift from the state 1203 to the state 1202, which will be described below. The control unit 308 updates the time of the failure in the communication test with the information processing apparatus 211, which is stored in step S1004 illustrated in FIG. 10, with the present time. The printing system shifts between the state 1202 and the state 1203 when the image forming apparatus 207 is powered off/on with the control unit 308 failing in the communication with the information processing apparatus 211, which enables an accurate calculation of the time during which the image forming apparatus 207 is in operation. If the control unit 308 succeeds in the communication test with the information processing apparatus 211 in the state 1202, the printing system shifts to a state 1204. Before the shift to the state 1204, the control unit 308 acquires the shutdown time stored in step S1004 and at the time of the shift from the state 1203 to the state 1202, calculates the difference from the present time, and adds the calculated difference to the operating time B. In the state 1204, the information processing apparatus 211 is in operation, and the network is also normal among the information processing apparatus 211, the printing control apparatus 201, and the image forming apparatus 207. Therefore, the printing system shifts to an end state 1205 to end the present state transition. The shift to the state 1205 causes the end of the process of step S1007 in the flowchart illustrated in FIG. 10. After the end of the process of step S1007, the control unit 308 advances the processing to step S1006.

In step S1006, the control unit 308 conducts the communication test with the information processing apparatus 211 again. If the control unit 308 succeeds in the communication test (the second detection) (YES in step S1006), the control unit 308 advances the processing to step S1008.

In step S1008, the control unit 308 adds a power supply use state additional attribute to the power supply state notification packet, sets the operating time B to this value, and transmits this packet to the LAN 210 via the interface unit 306. Upon transmitting the packet, the control unit 308 advances the processing to step S1009, in which the control unit 308 initializes the operating time B, and then ends the processing in the image forming apparatus 207.

In this manner, according to the above-described respective exemplary embodiments, it is possible to allow the information processing apparatus 211 to further accurately calculate the power consumption of the image forming apparatus 207.

More specifically, in the printing system including the image forming apparatus 207 with the printing control apparatus 201 connected thereto, even in such a state that the printing control apparatus 201 cannot transfer the power supply state notification packet transmitted from the image forming apparatus 207 to the LAN, it is possible to more accurately calculate the power consumption of the image forming apparatus 207. Further, even in a case where some problem occurs in the network environment among the information processing apparatus 211, the printing control apparatus 201, and the image forming apparatus 207 to make communication among them impossible, it is possible to more accurately calculate the power consumption of the image forming apparatus 207 once the communication resumes.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Having described exemplary embodiments of the present invention in detail, it should be noted that the present invention is not limited to such specific exemplary embodiments, and can be modified and changed in various manners within the range of the scope of the present invention defined in the claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-158021 filed Jul. 13, 2012, which is hereby incorporated by reference herein in its entirety.

What is claimed is:
1. An image processing apparatus comprising:
a communication unit configured to communicate with a control apparatus configured to transfer power supply state information indicating a power supply state of the image processing apparatus to an information processing apparatus configured to calculate a power consumption amount based on the power supply state information;
a first detection unit configured to detect a shift of the control apparatus to such a state that the control apparatus cannot transfer the power supply state information to the information processing apparatus;
a second detection unit configured to detect a shift of the control apparatus to such a state that the control apparatus can transfer the power supply state information to the information processing apparatus; and
a control unit configured to control the communication unit so as to transmit information for calculating a power consumption amount of the image processing apparatus during a period from detection by the first detection unit about the shift to the state prohibiting a transfer to the information processing apparatus to detection by the second detection unit about the shift to the state allowing the transfer to the information processing apparatus, to the control apparatus together with the power supply state information.

2. The image processing apparatus according to claim 1, wherein the information for calculating the power consumption amount includes at least an operating time of the image processing apparatus.

3. The image processing apparatus according to claim 2, further comprising a calculation unit configured to calculate the operating time of the image processing apparatus during the period from the detection by the first detection unit about the shift to the state prohibiting the transfer to the information processing apparatus to the detection by the second detection unit about the shift to the state allowing the transfer to the information processing apparatus,
wherein the communication unit attaches the operating time calculated by the calculation unit to the power supply state information, and transmits the power supply state information to the control apparatus.

4. The image processing apparatus according to claim 1, wherein the first detection unit detects the shift of the control apparatus to the state in which the control apparatus cannot transfer the power supply state information to the information processing apparatus, when the control apparatus is powered off, and
wherein the second detection unit detects that the shift of the control apparatus to the state in which the control apparatus can transfer the power supply state information to the information processing apparatus, when the control apparatus is powered on.

5. The image processing apparatus according to claim 1, wherein the first detection unit detects the shift of the control apparatus to the state in which the control apparatus cannot transfer the power supply state information to the information processing apparatus according to a notification about abnormality in a network state from the control apparatus, and
wherein the second detection unit detects the shift of the control apparatus to the state in which the control apparatus can transfer the power supply state information to the information processing apparatus according to a notification reporting that the abnormality is solved in the network state from the control apparatus.

6. The image processing apparatus according to claim 1, wherein the first detection unit detects the shift of the control apparatus to the state in which the control apparatus cannot transfer the power supply state information to the information processing apparatus according to a lack of response as a result of a communication test with the information processing apparatus, and
wherein the second detection unit detects the shift of the control apparatus to the state in which the control apparatus can transfer the power supply state information to the information processing apparatus according to reception of the response as a result of the communication test with the information processing apparatus.

7. The image processing apparatus according to claim 6, further comprising an execution unit configured to conduct the communication test with the information processing apparatus.

8. A method for controlling an image processing apparatus including a communication unit configured to communicate with a control apparatus configured to transfer power supply state information indicating a power supply state of the image processing apparatus to an information processing apparatus configured to calculate a power consumption amount based on the power supply state information, the method comprising:
detecting a shift of the control apparatus to such a state that the control apparatus cannot transfer the power supply state information to the information processing apparatus as first detection;
detecting a shift of the control apparatus to such a state that the control apparatus can transfer the power supply state information to the information processing apparatus as second detection; and
transmitting information for calculating a power consumption amount of the image processing apparatus during a period from the first detection about the shift to the state prohibiting a transfer to the information processing apparatus to the second detection about the shift to the state allowing the transfer to the information processing apparatus, to the control apparatus together with the power supply state information.

9. A non-transitory storage medium storing a program for causing a computer to perform a method for controlling an image processing apparatus including a communication unit configured to communicate with a control apparatus configured to transfer power supply state information indicating a power supply state of the image processing apparatus to an information processing apparatus configured to calculate a power consumption amount based on the power supply state information, the method comprising:
detecting a shift of the control apparatus to such a state that the control apparatus cannot transfer the power supply state information to the information processing apparatus as first detection;
detecting a shift of the control apparatus to such a state that the control apparatus can transfer the power supply state information to the information processing apparatus as second detection; and
transmitting information for calculating a power consumption amount of the image processing apparatus during a period from the first detection about the shift to the state prohibiting a transfer to the information processing apparatus to the second detection about the shift to the state allowing the transfer to the information processing apparatus, to the control apparatus together with the power supply state information.

* * * * *